United States Patent

Chan

(10) Patent No.: US 10,348,579 B2
(45) Date of Patent: Jul. 9, 2019

(54) UBIQUITOUS TROUBLE MANAGEMENT AND E-SERVICE ECOSYSTEM FOR THE INTERNET OF THINGS

(71) Applicant: ORACLE INTERNATIONAL CORPORATION, Redwood Shores, CA (US)

(72) Inventor: Victor Chung-Wai Chan, Saratoga, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 254 days.

(21) Appl. No.: 14/325,751

(22) Filed: Jul. 8, 2014

(65) Prior Publication Data

US 2016/0013993 A1 Jan. 14, 2016
US 2017/0187584 A9 Jun. 29, 2017

Related U.S. Application Data

(60) Provisional application No. 61/847,179, filed on Jul. 17, 2013.

(51) Int. Cl.
*H04L 12/24* (2006.01)
*G06Q 30/00* (2012.01)
*H04L 29/08* (2006.01)

(52) U.S. Cl.
CPC ....... *H04L 41/5074* (2013.01); *G06Q 30/016* (2013.01); *H04L 41/5064* (2013.01); *H04L 67/125* (2013.01)

(58) Field of Classification Search
CPC .............. H04L 41/5074; H04L 41/5064; H04L 67/125
See application file for complete search history.

(56) References Cited

U.S. PATENT DOCUMENTS 7,640,457 B2 * 12/2009 Erwin ................... G06F 11/079
714/26
8,266,072 B2 9/2012 Grace et al.
8,315,623 B1 * 11/2012 Flynn .................... H04W 24/04
455/405

(Continued)

FOREIGN PATENT DOCUMENTS

EP 1545056 A1 6/2005
EP 2183720 A2 5/2010

OTHER PUBLICATIONS

Pollock, W. "Device Relationship Management (DRM) Is Coming into Focus for Business Executives. Topline Results of the AFSM DRM Survey!", Copyright 2013, Retrieved from www.s4growth.com/publications/ARticles/17.cfm, 10 pages.

(Continued)

*Primary Examiner* — Habte Mered
*Assistant Examiner* — Brian P Cox
(74) *Attorney, Agent, or Firm* — Kraguljac Law Group, LLC

(57) ABSTRACT

Embodiments of the invention provide systems and methods for an eService ecosystem that provides a common trouble ticket platform for creating and handling trouble tickets generated by and received from an "Internet of Things (IoT)." More specifically, many product vendors are moving to make all of their products internet connected. This move includes not only products that are typically considered to be technology-type products such as personal computers, cellphones, media players, etc., but any and all types of products including but not limited to household appliances, automobiles, medical devices, and a variety of other devices which are increasingly available with processing and communications abilities. Embodiments of the present invention provide a common trouble ticket management platform that all Internet of Things vendors can use.

19 Claims, 6 Drawing Sheets

(56) References Cited

U.S. PATENT DOCUMENTS

| | | | | |
|---|---|---|---|---|
| 9,077,611 | B2* | 7/2015 | Cordray | H04L 41/0213 |
| 2007/0022320 | A1* | 1/2007 | Flocken | G06F 11/0709 |
| | | | | 714/37 |
| 2007/0033069 | A1* | 2/2007 | Rao | A63B 24/00 |
| | | | | 705/2 |
| 2008/0077697 | A1* | 3/2008 | Chu | H04L 63/0272 |
| | | | | 709/229 |
| 2008/0195614 | A1* | 8/2008 | Lutz | H04L 41/0654 |
| 2010/0010848 | A1 | 1/2010 | Marchman et al. | |
| 2011/0112846 | A1 | 5/2011 | Zhu | |
| 2013/0003563 | A1* | 1/2013 | Croak | H04L 41/0609 |
| | | | | 370/242 |
| 2013/0073470 | A1 | 3/2013 | White et al. | |
| 2013/0080251 | A1* | 3/2013 | Dempski | G06Q 30/01 |
| | | | | 705/14.53 |
| 2013/0090976 | A1 | 4/2013 | White et al. | |
| 2013/0218783 | A1* | 8/2013 | Anand | G06Q 10/20 |
| | | | | 705/304 |
| 2013/0332303 | A1* | 12/2013 | Schank | G06Q 30/0641 |
| | | | | 705/26.4 |
| 2015/0046578 | A1* | 2/2015 | Caicedo | H04L 67/2809 |
| | | | | 709/224 |
| 2015/0120487 | A1* | 4/2015 | Arthurs | G06Q 30/0611 |
| | | | | 705/26.4 |
| 2015/0149850 | A1* | 5/2015 | Leach | G06F 11/3452 |
| | | | | 714/751 |
| 2015/0278823 | A1* | 10/2015 | Kushnir | G06Q 30/016 |
| | | | | 705/304 |

OTHER PUBLICATIONS

LEGENDSOFT, INC "SPoTS—Service and Problem Tracking System", Retrieved Aug. 7, 2013 from www.troubleticketsoftware.com/trouble-ticket-software-description.htm, 1 page.

Author Unknown, "Intelligent Things: Managing the Internet of Things", Retrieved Aug. 7, 2013 from http://intelligentthings.com/content/managing-internet-things, 15 pages.

* cited by examiner

UBIQUITOUS TROUBLE MANAGEMENT AND E-SERVICE ECOSYSTEM FOR THE INTERNET OF THINGS

CROSS-REFERENCES TO RELATED APPLICATIONS

The present application claims benefit under 35 USC 119(e) of U.S. Provisional Application No. 61/847,179, filed on Jul. 17, 2013 by Chan. and entitled "Ubiquitous Trouble Management and E-Service Ecosystem for the Internet of Things," of which the entire disclosure is incorporated herein by reference for all purposes.

BACKGROUND OF THE INVENTION

Embodiments of the present invention relate generally to methods and systems for creating, reporting, and handling trouble tickets in a Customer Relationship Management (CRM) system and more particularly to an eService ecosystem that provides a common trouble ticket platform for creating and handling trouble tickets generated by and received from an Internet of Things.

A Customer Relationship Management (CRM) application is one type of enterprise application that can provide support for customers of a product or service by allowing those users to make requests for service or otherwise report problems with those products or services. When a request or other report is received, the CRM application typically creates what is commonly referred to as a trouble ticket which is a record of the issue. This trouble ticket is then used by the CRM application as the system attempts to address the request or report, for example by assigning the trouble ticket to an automated process and/or human agent for answering the question or handling the problem.

Today, there is a ton of waste and inefficiency in how trouble tickets are created and reported. Typically, a consumer detects an issue with their appliance, car, gadget, software application, etc. and then they have to manually report the issue to an agent, who then tries to trouble-shoot the problem. A lot of information is lost in this manual process. Even some routine information such as a product serial number or even model number, are difficult to locate and awkward to communicate over the phone line. Reporting issues after-the-fact often also means that the problem may not be reproducible (e.g. an intermittent car failure) and/or major consequences could not be averted (e.g. refrigerator issue causing all the food to go bad). Today's manual approach to trouble ticket reporting is expensive for the product vendor and frustrating to the consumer. Hence, there is a need for improved methods and systems for creating, reporting, and handling trouble tickets in a CRM system.

BRIEF SUMMARY OF THE INVENTION

Embodiments of the invention provide systems and methods for an eService ecosystem that provides a common trouble ticket platform for creating and handling trouble tickets generated by and received from an Internet of Things. According to one embodiment, the trouble ticket can be generated by a device agent executing on the Internet-enabled consumer product and can comprise a set of predefined content in a predefined format based on a type of the consumer product. The device agent can be generated through one of a plurality of different toolkits, each of the plurality or different toolkits directed to a different type of consumer product and the set of predefined content in the predefined format of the trouble ticket can be defined, at least in part, by the toolkit. Such a device agent can monitor the consumer product for one or more conditions or events, detect an occurrence of the one or more conditions or events, and in response to detecting the occurrence of the one or more conditions or events, generating the trouble ticket and sending the trouble ticket to a catcher service. Generating the trouble ticket can comprise generating the set of predefined content. For example, the set of predefined content can comprise one or more of an error log, one or more images, a serial number of the consumer product, a model number of the consumer product, a version number of the consumer product, or a build number of the consumer product. In some cases, generating the trouble ticket can further comprise generating a set of custom content defined by a producer of the consumer product.

A computer system executing the catcher service can receive the trouble ticket from the device agent of the consumer product, process the received trouble ticket, and forward the trouble ticket to a Customer Relationship Management (CRM) application. For example, processing the trouble ticket can comprise identifying a vendor of the consumer product to which the trouble ticket relates from a plurality of vendors and forwarding the trouble ticket to the CRM application can comprise forwarding the trouble ticket to a CRM application associated with the identified vendor. The computer system executing the CRM application can receive the trouble ticket from the catcher service and process the received trouble ticket. Processing the received trouble ticket can comprise assigning the trouble ticket to an automated process or a human agent for handling problems with the consumer product represented by the trouble ticket.

In some cases, processing the trouble ticket can comprise filtering the received trouble ticket based on a set of criteria provided by a vendor of the consumer product. Additionally or alternatively, processing the trouble ticket can comprise aggregating the trouble ticket with one or more other trouble tickets based on a customer, a product, or a vendor of the consumer product related to the trouble ticket. In some cases, processing the trouble ticket can additionally or alternatively comprise maintaining one or more metrics related to received trouble tickets, the metrics comprising at least a count per product or a count per vendor.

In some cases, a computer system executing an eService marketplace can provide a number of additional services including but not limited to analytics services based on received trouble tickets. For example, the eService marketplace can receive a request from a consumer related to the trouble ticket. The request can comprise a request for bids for service of the consumer product. The eService marketplace can provide access to the trouble ticket to a plurality of service providers in response to the request from the consumer and can receive one or more bids for service of the consumer product from one or more of the plurality of service providers. Information related to the received bids can then be provided to the consumer. For example, the information related to the received bids can comprise one or more of cost of each bid, a customer rating or each service provider from which one or more of the bids is received, or analytics information about performance of each service provider from which one or more of the bids is received. In some cases, a rating of one or the service providers can be received by the eService marketplace from the consumer. The rating can be based on performance of service directed to the trouble ticket by the service provider.

Other services provided by the eService marketplace can include, for example, providing one or more of notification of product issues or recalls, access to information related to issue resolution, information or an interface for arranging for repairs, or access to technical information related to the consumer product. Additionally or alternatively, the eService marketplace can provide an automatic registration process. In some cases, the eService marketplace can additionally or alternatively provide one or more of automatic product updates, automatic product alters, or personalized identification of trouble tickets by customer.

DETAILED DESCRIPTION OF THE INVENTION

Figure 1:
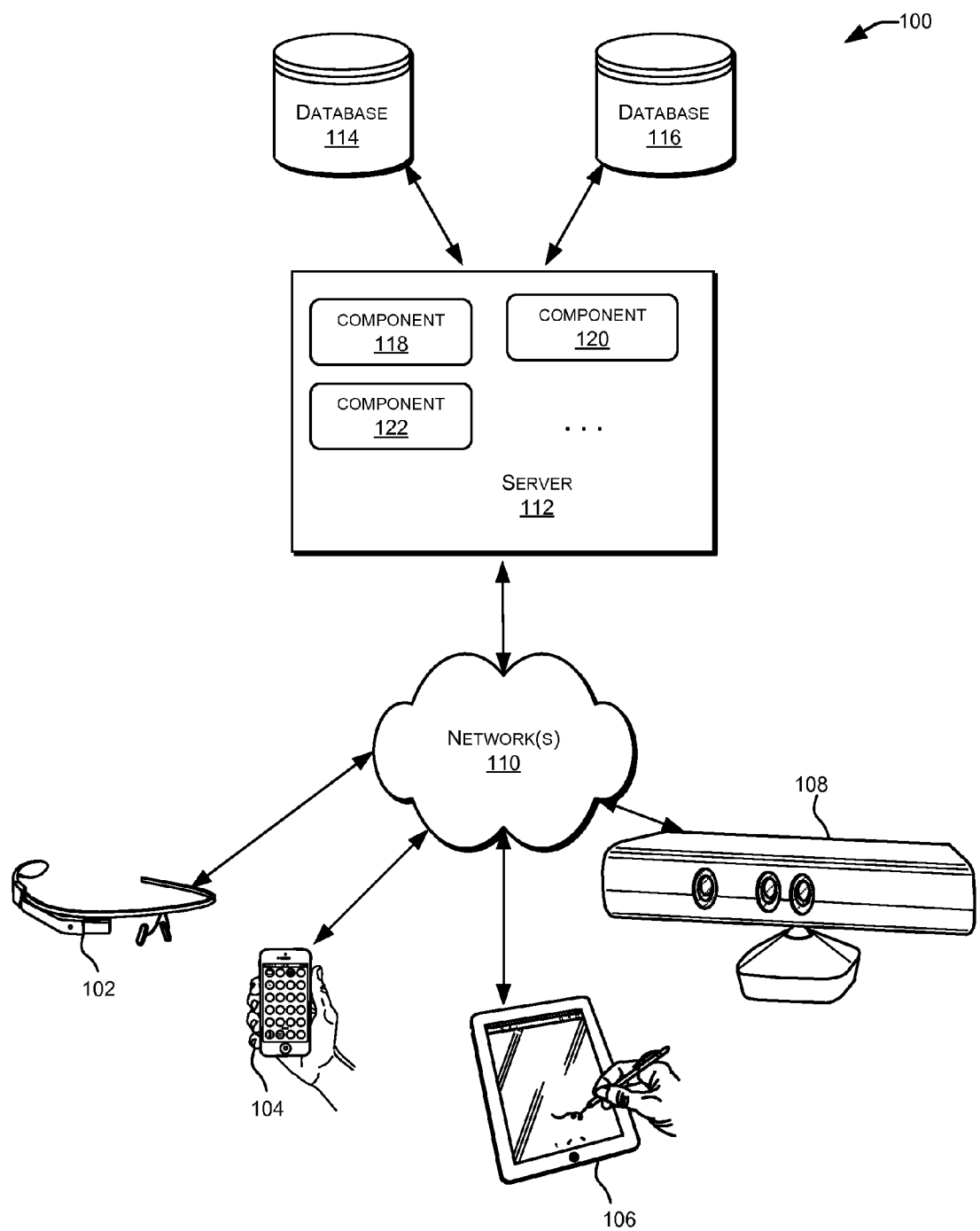
FIG. 1 is a block diagram illustrating components of an exemplary distributed system in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for an eService ecosystem that provides a common trouble ticket platform for creating and handling trouble tickets generated by and received from an Internet of Things. More specifically, many product vendors are moving to make all of their products internet connected. This move includes not only products that are typically considered to be technology-type products such as personal computers, cellphones, media players, etc., but any and all types of products including but not limited to household appliances, automobiles, medical devices, and a variety of other devices which are increasingly available with processing and communications abilities. This trend can be seen as a rise of an "Internet of Things (IoT)" which expands what has become the traditional Internet of servers and client computers to include an ever increasing array of different types of products.

As the IoT grows, opportunities exist to improve upon the customer experiences provided by CRM applications and systems. Left to their own, product vendors may create their own proprietary mechanism for creating trouble tickets, managing them, alerting customers, and coordinating repairs with their service partner network. But, the likely outcome of these efforts will be that each vendor will spend a significant amount on R&D, and the end result will be an inefficient new ocean of proprietary and disconnected solutions. Embodiments of the present invention provide a common trouble ticket management platform that all Internet of Things vendors can use. The widespread adoption of a common trouble ticket standard during this IoT revolution would allow a new efficiency to emerge. Various additional details of embodiments of the present invention will be described below with reference to the figures.

FIG. 1 is a block diagram illustrating components of an exemplary distributed system in which various embodiments of the present invention may be implemented. In the illustrated embodiment, distributed system 100 includes one or more client computing devices 102, 104, 106, and 108, which are configured to execute and operate a client application such as a web browser, proprietary client (e.g., Oracle Forms), or the like over one or more network(s) 110. Server 112 may be communicatively coupled with remote client computing devices 102, 104, 106, and 108 via network 110.

In various embodiments, server 112 may be adapted to run one or more services or software applications provided by one or more of the components of the system. In some embodiments, these services may be offered as web-based or cloud services or under a Software as a Service (SaaS) model to the users of client computing devices 102, 104, 106, and/or 108. Users operating client computing devices 102, 104, 106, and/or 108 may in turn utilize one or more client applications to interact with server 112 to utilize the services provided by these components.

In the configuration depicted in the figure, the software components 118, 120 and 122 of system 100 are shown as being implemented on server 112. In other embodiments, one or more of the components of system 100 and/or the services provided by these components may also be implemented by one or more of the client computing devices 102, 104, 106, and/or 108. Users operating the client computing devices may then utilize one or more client applications to use the services provided by these components. These components may be implemented in hardware, firmware, software, or combinations thereof. It should be appreciated that various different system configurations are possible, which may be different from distributed system 100. The embodiment shown in the figure is thus one example of a distributed system for implementing an embodiment system and is not intended to be limiting.

Client computing devices 102, 104, 106, and/or 108 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 102, 104, 106, and 108 may be any other electronic device, such as a thin-client computer, an Internet-enabled gaming system (e.g., a Microsoft Xbox gaming console with or without a Kinect® gesture input device), and/or a personal messaging device, capable of communicating over network(s) 110.

Although exemplary distributed system 100 is shown with four client computing devices, any number of client computing devices may be supported. Other devices, such as devices with sensors, etc., may interact with server 112.

Network(s) 110 in distributed system 100 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 110 can be a local area network (LAN), such as one based on Ethernet, Token-Ring and/or the like. Network(s) 110 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 112 may be adapted to run one or more services or software applications described in the foregoing disclosure. For example, server 112 may correspond to a server for performing processing described above according to an embodiment of the present disclosure.

Server 112 may run an operating system including any of those discussed above, as well as any commercially available server operating system. Server 112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 112 may include one or more applications to analyze and consolidate data feeds and/or event updates received from users of client computing devices 102, 104, 106, and 108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 112 may also include one or more applications to display the data feeds and/or real-time events via one or more display devices of client computing devices 102, 104, 106, and 108.

Distributed system 100 may also include one or more databases 114 and 116. Databases 114 and 116 may reside in a variety of locations. By way of example, one or more of databases 114 and 116 may reside on a non-transitory storage medium local to (and/or resident in) server 112. Alternatively, databases 114 and 116 may be remote from server 112 and in communication with server 112 via a network-based or dedicated connection. In one set of embodiments, databases 114 and 116 may reside in a storage-area network (SAN). Similarly, any necessary files for performing the functions attributed to server 112 may be stored locally on server 112 and/or remotely, as appropriate. In one set of embodiments, databases 114 and 116 may include relational databases, such as databases provided by Oracle, that are adapted to store, update, and retrieve data in response to SQL-formatted commands.

Figure 2:
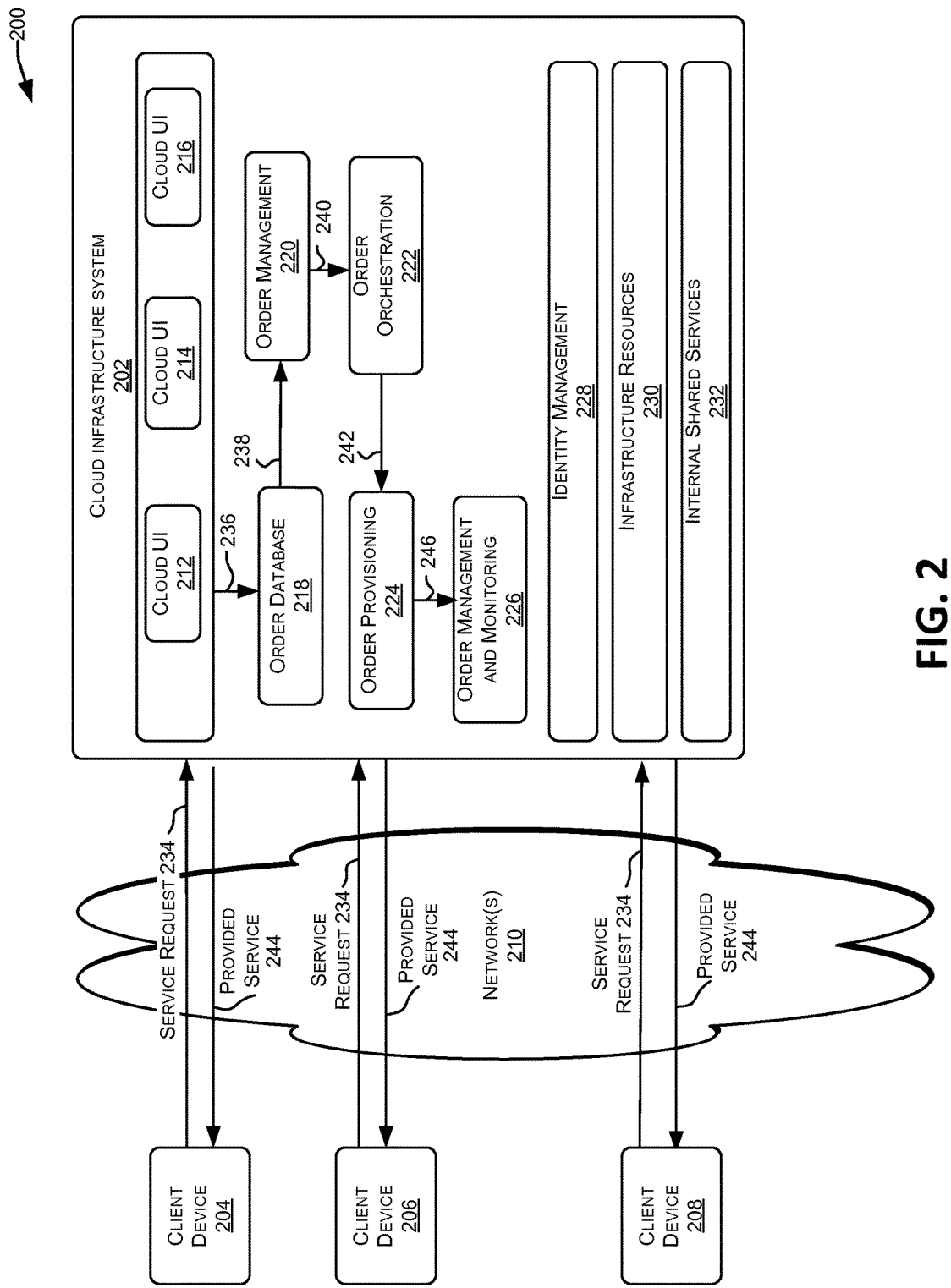
FIG. 2 is a block diagram illustrating components of a system environment by which services provided by embodiments of the present invention may be offered as cloud services.

FIG. 2 is a block diagram illustrating components of a system environment by which services provided by embodiments of the present invention may be offered as cloud services. In the illustrated embodiment, system environment 200 includes one or more client computing devices 204, 206, and 208 that may be used by users to interact with a cloud infrastructure system 202 that provides cloud services. The client computing devices may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in the figure may have other components than those depicted. Further, the embodiment shown in the figure is only one example of a cloud infrastructure system that may incorporate an embodiment of the invention. In some other embodiments, cloud infrastructure system 202 may have more or fewer components than shown in the figure, may combine two or more components, or may have a different configuration or arrangement of components.

Client computing devices 204, 206, and 208 may be devices similar to those described above for 102, 104, 106, and 108.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Each network may be any type of network familiar to those skilled in the art that can support data communications using any of a variety of commercially-available protocols, including those described above for network(s) 110.

Cloud infrastructure system 202 may comprise one or more computers and/or servers that may include those described above for server 112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 202 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 202 may be adapted to automatically provision, manage and track a customer's subscription to services offered by cloud infrastructure system 202. Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 202. Cloud infrastructure system 202 then performs processing to provide the services in the customer's subscription order.

In some embodiments, the services provided by cloud infrastructure system 202 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may also include infrastructure resources 230 for providing the resources used to provide various services to customers of the cloud infrastructure system. In one embodiment, infrastructure resources 230 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 230 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 232 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like.

In one embodiment, as depicted in the figure, cloud management functionality may be provided by one or more modules, such as an order management module 220, an order orchestration module 222, an order provisioning module 224, an order management and monitoring module 226, and an identity management module 228. These modules may include or be provided using one or more computers and/or servers, which may be general purpose computers, specialized server computers, server farms, server clusters, or any other appropriate arrangement and/or combination.

In exemplary operation 234, a customer using a client device, such as client device 204, 206 or 208, may interact with cloud infrastructure system 202 by requesting one or more services provided by cloud infrastructure system 202 and placing an order for a subscription for one or more services offered by cloud infrastructure system 202. In certain embodiments, the customer may access a cloud User Interface (UI), cloud UI 212, cloud UI 214 and/or cloud UI 216 and place a subscription order via these UIs. The order information received by cloud infrastructure system 202 in response to the customer placing an order may include information identifying the customer and one or more services offered by the cloud infrastructure system 202 that the customer intends to subscribe to.

After an order has been placed by the customer, the order information is received via the cloud UIs, 212, 214 and/or 216.

At operation 236, the order is stored in order database 218. Order database 218 can be one of several databases operated by cloud infrastructure system 218 and operated in conjunction with other system elements.

At operation 238, the order information is forwarded to an order management module 220. In some instances, order management module 220 may be configured to perform billing and accounting functions related to the order, such as verifying the order, and upon verification, booking the order.

At operation 240, information regarding the order is communicated to an order orchestration module 222. Order orchestration module 222 may utilize the order information to orchestrate the provisioning of services and resources for the order placed by the customer. In some instances, order orchestration module 222 may orchestrate the provisioning of resources to support the subscribed services using the services of order provisioning module 224.

In certain embodiments, order orchestration module 222 enables the management of business processes associated with each order and applies business logic to determine whether an order should proceed to provisioning. At operation 242, upon receiving an order for a new subscription, order orchestration module 222 sends a request to order provisioning module 224 to allocate resources and configure those resources needed to fulfill the subscription order. Order provisioning module 224 enables the allocation of resources for the services ordered by the customer. Order provisioning module 224 provides a level of abstraction between the cloud services provided by cloud infrastructure system 200 and the physical implementation layer that is used to provision the resources for providing the requested services. Order orchestration module 222 may thus be isolated from implementation details, such as whether or not services and resources are actually provisioned on the fly or pre-provisioned and only allocated/assigned upon request.

At operation 244, once the services and resources are provisioned, a notification of the provided service may be sent to customers on client devices 204, 206 and/or 208 by order provisioning module 224 of cloud infrastructure system 202.

At operation 246, the customer's subscription order may be managed and tracked by an order management and monitoring module 226. In some instances, order management and monitoring module 226 may be configured to collect usage statistics for the services in the subscription order, such as the amount of storage used, the amount data transferred, the number of users, and the amount of system up time and system down time.

In certain embodiments, cloud infrastructure system 200 may include an identity management module 228. Identity management module 228 may be configured to provide identity services, such as access management and authorization services in cloud infrastructure system 200. In some embodiments, identity management module 228 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 228 may also include the management of descriptive information about each customer and about how and by whom that descriptive information can be accessed and modified.

Figure 3:
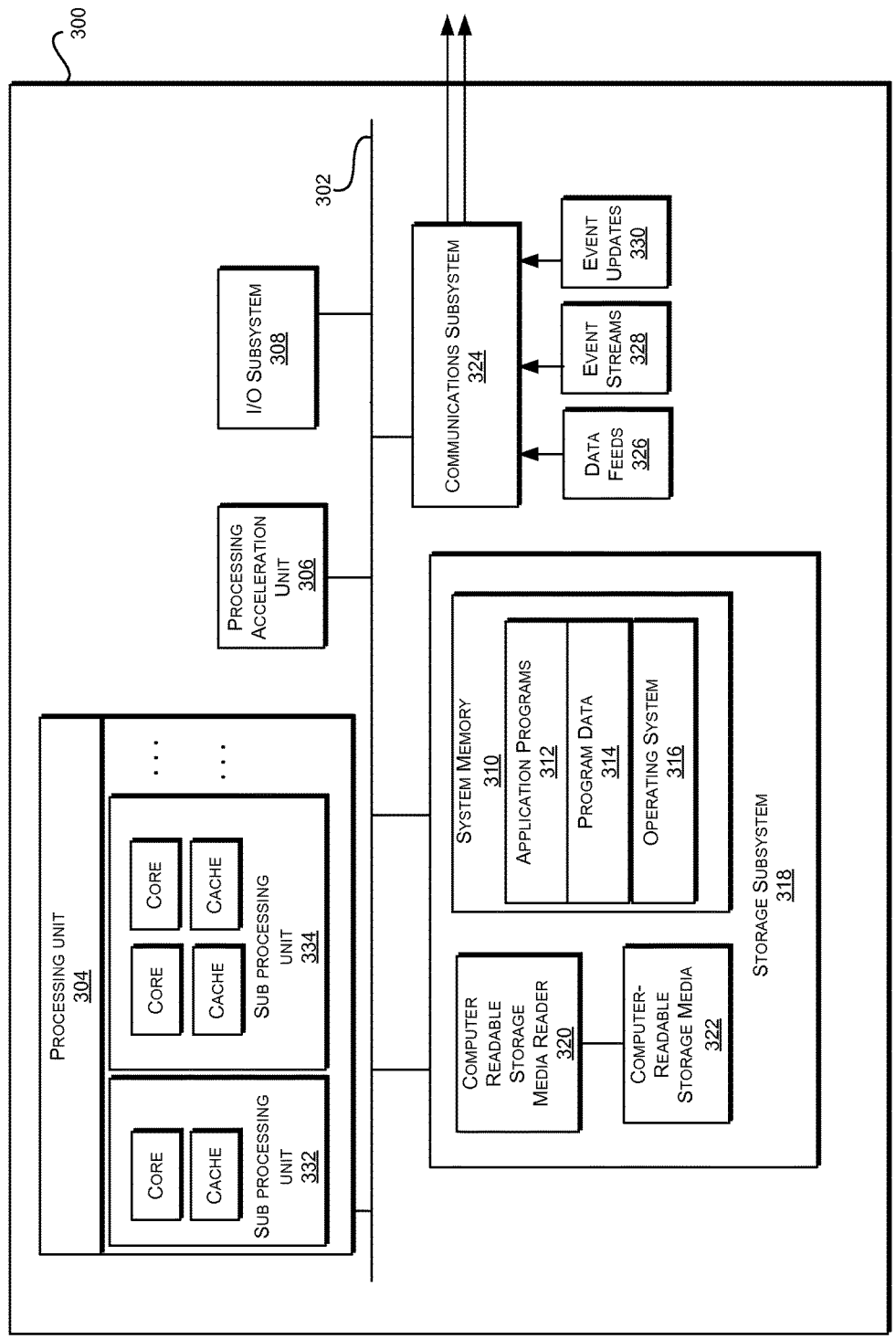
FIG. 3 is a block diagram illustrating an exemplary computer system in which embodiments of the present invention may be implemented.

FIG. 3 is a block diagram illustrating an exemplary computer system in which embodiments of the present invention may be implemented. The system 300 may be used to implement any of the computer systems described above. As shown in the figure, computer system 300 includes a processing unit 304 that communicates with a number of peripheral subsystems via a bus subsystem 302. These peripheral subsystems may include a processing acceleration unit 306, an I/O subsystem 308, a storage subsystem 318 and a communications subsystem 324. Storage subsystem 318 includes tangible computer-readable storage media 322 and a system memory 310.

Bus subsystem 302 provides a mechanism for letting the various components and subsystems of computer system 300 communicate with each other as intended. Although bus subsystem 302 is shown schematically as a single bus, alternative embodiments of the bus subsystem may utilize multiple buses. Bus subsystem 302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 304, which can be implemented as one or more integrated circuits (e.g., a conventional microprocessor or microcontroller), controls the operation of computer system 300. One or more processors may be included in processing unit 304. These processors may include single core or multicore processors. In certain embodiments, processing unit 304 may be implemented as one or more independent processing units 332 and/or 334 with single or multicore processors included in each processing unit. In other embodiments, processing unit 304 may also be implemented as a quad-core processing unit formed by integrating two dual-core processors into a single chip.

In various embodiments, processing unit 304 can execute a variety of programs in response to program code and can maintain multiple concurrently executing programs or processes. At any given time, some or all of the program code to be executed can be resident in processor(s) 304 and/or in storage subsystem 318. Through suitable programming, processor(s) 304 can provide various functionalities described above. Computer system 300 may additionally include a processing acceleration unit 306, which can include a digital signal processor (DSP), a special-purpose processor, and/or the like.

I/O subsystem 308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 300 may comprise a storage subsystem 318 that comprises software elements, shown as being currently located within a system memory 310. System memory 310 may store program instructions that are loadable and executable on processing unit 304, as well as data generated during the execution of these programs.

Depending on the configuration and type of computer system 300, system memory 310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 304. In some implementations, system memory 310 may include multiple different types of memory, such as static random access memory (SRAM) or dynamic random access memory (DRAM). In some implementations, a basic input/output system (BIOS), containing the basic routines that help to transfer information between elements within computer system 300, such as during start-up, may typically be stored in the ROM. By way of example, and not limitation, system memory 310 also illustrates application programs 312, which may include client applications, Web browsers, mid-tier applications, relational database management systems (RDBMS), etc., program data 314, and an operating system 316. By way of example, operating system 316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 318 may also provide a tangible computer-readable storage medium for storing the basic programming and data constructs that provide the functionality of some embodiments. Software (programs, code modules, instructions) that when executed by a processor provide the functionality described above may be stored in storage subsystem 318. These software modules or instructions may be executed by processing unit 304. Storage subsystem 318 may also provide a repository for storing data used in accordance with the present invention.

Storage subsystem 300 may also include a computer-readable storage media reader 320 that can further be connected to computer-readable storage media 322. Together and, optionally, in combination with system memory 310, computer-readable storage media 322 may comprehensively represent remote, local, fixed, and/or removable storage devices plus storage media for temporarily and/or more permanently containing, storing, transmitting, and retrieving computer-readable information.

Computer-readable storage media 322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 300.

By way of example, computer-readable storage media 322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 322 may include, but is not limited to, Zip® drives, flash memory cards, universal serial bus (USB) flash drives, secure digital (SD) cards, DVD disks, digital video tape, and the like. Computer-readable storage media 322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 300.

Communications subsystem 324 provides an interface to other computer systems and networks. Communications subsystem 324 serves as an interface for receiving data from and transmitting data to other systems from computer system 300. For example, communications subsystem 324 may enable computer system 300 to connect to one or more devices via the Internet. In some embodiments communications subsystem 324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 324 can provide wired network connectivity (e.g., Ethernet) in addition to or instead of a wireless interface.

In some embodiments, communications subsystem 324 may also receive input communication in the form of structured and/or unstructured data feeds 326, event streams 328, event updates 330, and the like on behalf of one or more users who may use computer system 300.

By way of example, communications subsystem 324 may be configured to receive data feeds 326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 324 may also be configured to receive data in the form of continuous data streams, which may include event streams 328 of real-time events and/or event updates 330, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 324 may also be configured to output the structured and/or unstructured data feeds 326, event streams 328, event updates 330, and the like to one or more databases that may be in communication with one or more streaming data source computers coupled to computer system 300.

Computer system 300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Figure 4:
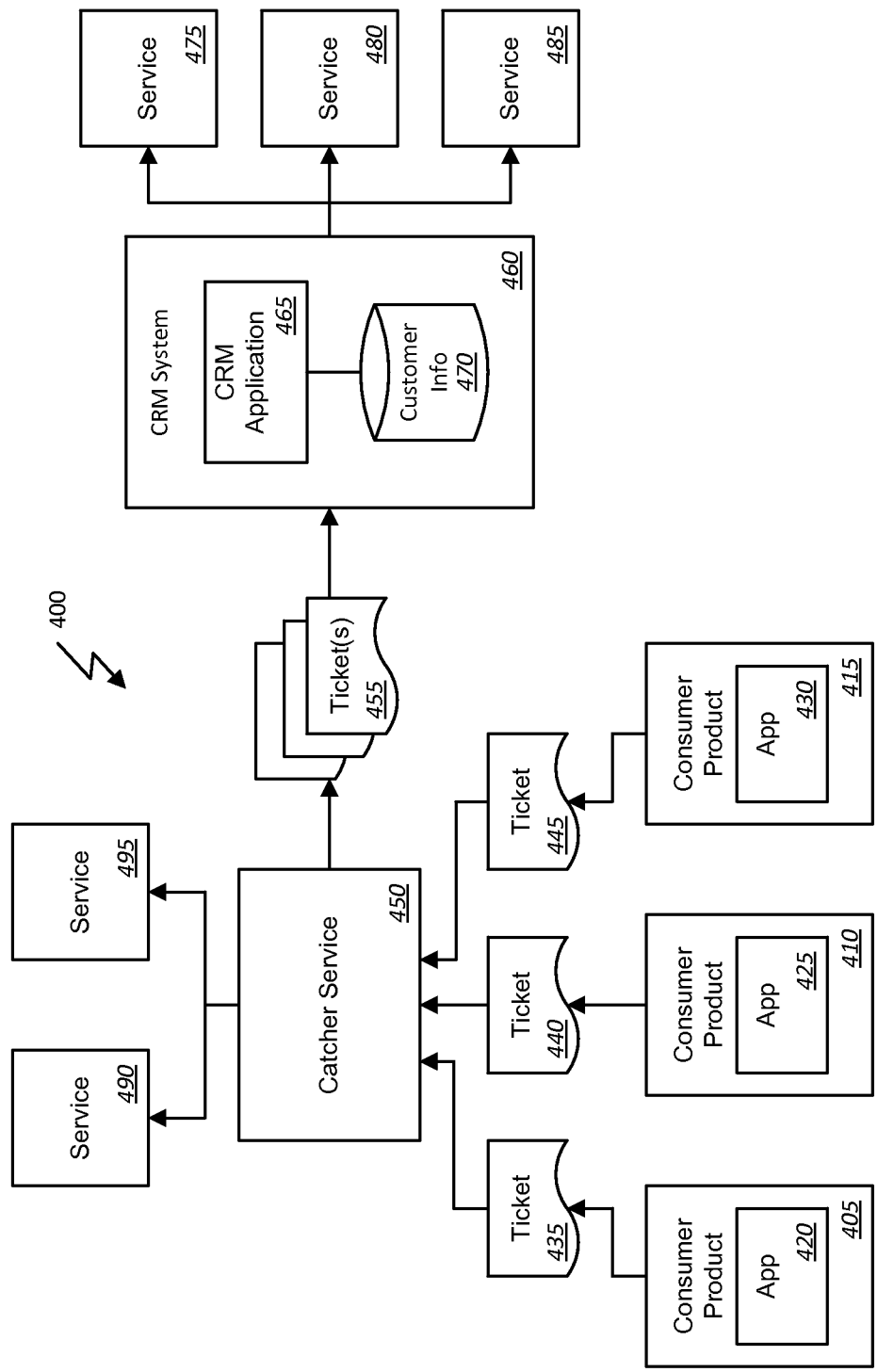
FIG. 4 is a block diagram illustrating a trouble management and e-service ecosystem according to one embodiment of the present invention.

FIG. 4 is a block diagram illustrating a trouble management and e-service ecosystem according to one embodiment of the present invention. As illustrated here, the system 400 can include any number and variety of different consumer products 405-415, i.e., the "Internet of Things" introduced above. As noted, these products 405-415 can comprise technology-type products such as personal computers, cellphones, media players, etc., but also any and all types of products including but not limited to household appliances, automobiles, medical devices, and a variety of other devices. Generally speaking, these products 405-415 can include any product that includes a memory, processor, and communications components to allow that product to perform the functions described herein.

According to one embodiment, lightweight toolkits can be provided for vendors of these products 405-415 to allow them to easily create and embed trouble ticket creation applications 420-430 into their products. Generally speaking, these trouble ticket creation applications 420-430 can comprise a small application stored on and executed by the various products 405-415. There may be multiple versions of toolkits and/or trouble ticket creation applications 420-430 for different target environments, such as appliances, cars, gadgets, enterprise apps, mobile apps, etc. However, each of the different versions can perform operations to monitor the product 405-415 and, upon the detection of particular conditions, create a trouble ticket 435-445 at the source of the problems.

Generally speaking, these trouble tickets 435-445 can follow a particular set of standards for format and contents but may include, for example, information such as an error log, screenshots, a serial number of the product, model/version/build number of the product, etc. However, it should also be understood that the exact implementations of trouble tickets 435-445 and the trouble ticket creation applications 420-430 may expand the contents of the tickets 435-445 beyond any pre-defined standard to include additional information relevant to that particular product or how the information from the ticket might eventually be used by other services. In other words, while the trouble tickets 435-445 may be instances of a pre-defined object with certain properties inherited from a standard object, the properties of a ticket for a particular product should also be customizable so that a vendor of that product can add additional information to the ticket 435-445 as that vendor decides is appropriate. Once generated by the trouble ticket creation application 420 on a particular product 405, the trouble ticket can be transmitted over the Internet or other communications network using any of a variety of wired and/or wireless communications channels that may be implemented in that particular device.

According to one embodiment, the system 400 can also include a server or other computer system hosting a "catcher" service 450 which allows the products 435-445 to log trouble tickets 435-445 over the Internet. Generally speaking, the catcher service 450 can receive the trouble tickets 435-445 from the various products and perform a variety of different functions such as identifying which vendor they relate to and forwarding those tickets 455 to a Customer Relationship Management (CRM) system 460 for that vendor. Other functions performed by the catcher service 450 may include, for example, filtering received tickets 435-445 based on a set of criteria for the service, perhaps provided by the various product vendors, aggregating tickets 435-445 by customer, product, vendor, etc., and/or maintaining metrics related to the received tickets 435-445 such as a count per product, vendor, etc. Other functions of the catcher system 450, some of which will be described below, are contemplated and considered to be within the scope of the present invention.

According to one embodiment, rather than or in addition to providing toolkits to generate and embed the trouble ticket creation applications 420-430 into the various products 405-415, the catcher service 450 may be implemented as a web service, i.e., a catcher web service. Such a catcher web service can provide an interface accessible to any Internet-connected device and through which these devices can report errors. That is, the interface of the catcher web service can provide for receiving trouble information from the various products 405-415 and generating the trouble tickets based on the received information.

As noted above, the system 400 can also include any number of CRM systems 460 for various product vendors. Each CRM system 460 can execute an instance of a CRM application 465 which may in turn utilize and maintain a set of customer information 470 for and related to the customers of the various products 405-415 for that particular vendor. The CRM system 460 can receive trouble tickets 455 from the catcher service 450 and the received tickets can then be used by the CRM application 465 as the system attempts to address the issues represented by the tickets, for example by assigning the trouble tickets to automated processes and/or human agents for answering the questions or handling the problems represented by the trouble tickets 455. It should be noted that, while the catcher service 450 and CRM system 460 are illustrated and described here as separate, in some implementations the catcher service 450 might in fact be implemented as part of the CRM system without departing from the scope of the present invention.

According to one embodiment, any number of additional services 475-495 may be built around and/or supported by the functions of the catcher service 450 and/or CRM system 460. These services 475-495 may be implemented on and executed by either or both of the catcher service 450 and/or CRM system 460 or may be implemented on and executed by remote servers (not shown here) which may, in some cases, be operated by third-party service providers. These services 475-495 can perform a wide variety of functions based on the information provided by the products 405-415 in the trouble tickets 435-445. For example, one or more services may offer analytics based on the trouble tickets. In another example, services may be provided that, together with the catcher service 450 and/or CRM system 460, implement an eService marketplace where consumers can be automatically notified of product issues and can easily access a resolution or arrange for a repair, and vendors can easily share technical information with their outsourced service partners. In such implementations, the CRM applications could facilitate their workflows from customer notification to incident management to cross-channel support to dispatch to RMA. Additionally or alternatively, one or more services may work with eCommerce providers to implement an end-to-end product registration experience whereby products can be automatically registered to the owner at or near the time of purchase. Through such a registration process, an online retailer (e.g. Amazon, BestBuy, etc.) can, leveraging the information they already have about the consumer, automatically register a purchased product on the consumer's behalf, saving the consumer the extra effort of registering afterwards and insuring that the consumer can be successfully contacted when there is an error. Further, based on this registration process, the buyer can get product updates and proactive alerts and generated trouble tickets can be identified by customer for proper handling and resolution by the CRM system and/or other services. One or more services may additionally or alternatively offer remote diagnostics technologies to help vendors trouble-shoot problems that were reported. Other services built upon and leveraging the information of trouble tickets generated automatically by the individual products 405-415 are contemplated and considered to be within the scope of the present invention.

As a result of implementing a system 400 as described here, product vendors large and small can create and manage trouble tickets professionally with minimal upfront and on-going R&D investment. By adopting a standard trouble ticket platform, the vendors can participate in a new eService ecosystem where their consumers and partners (e.g. outsourced service partners, parts suppliers, etc.) can exchange information and coordinate service actions seamlessly and efficiently. Consumers can get immediate notification of product issues and can easily access service. They have ready access to a service network that is well informed and ready to help them.

Figure 5:
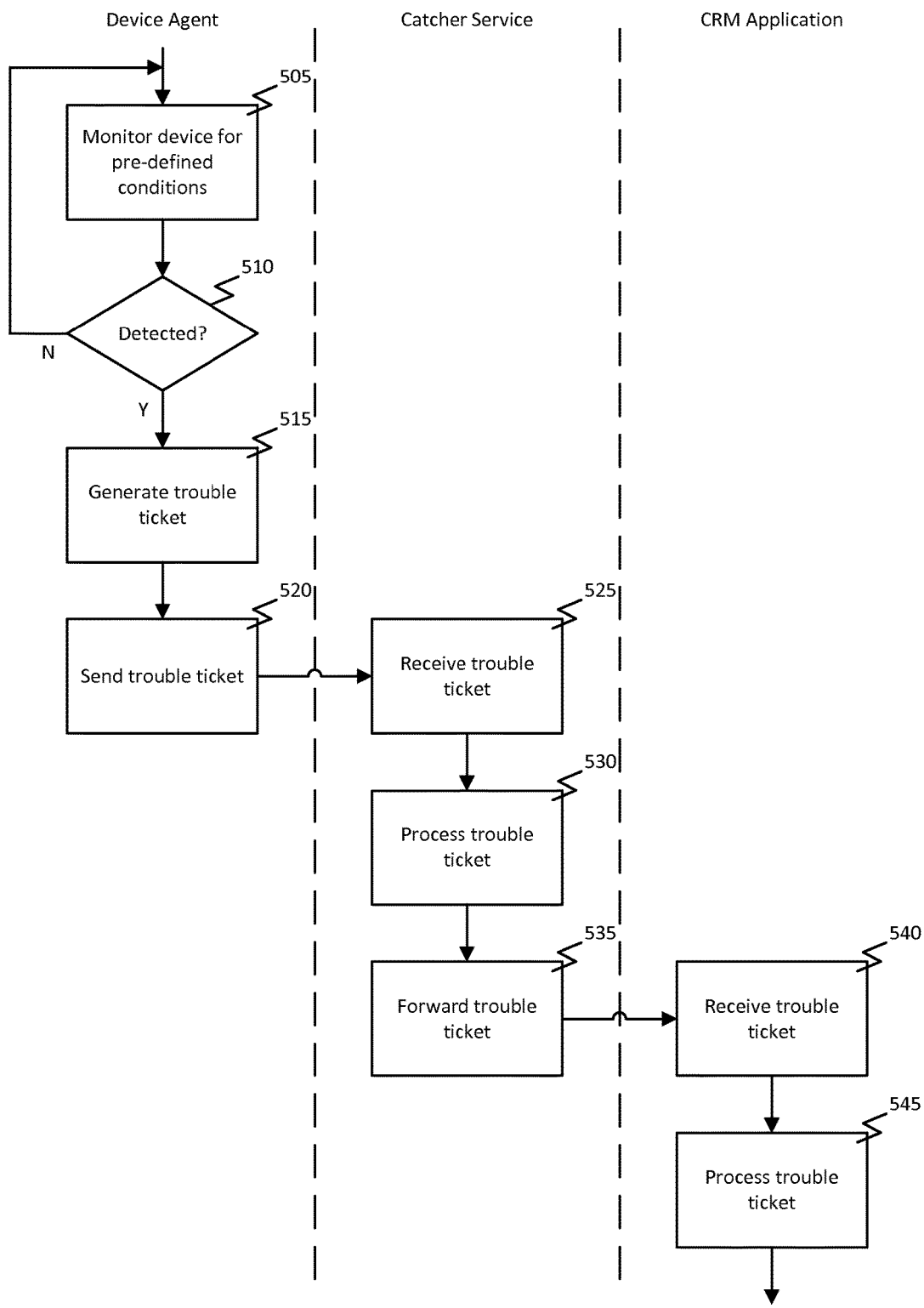
FIG. 5 is a flowchart illustrating a process for creating and handling trouble tickets in a common trouble ticket platform according to one embodiment of the present invention.

FIG. 5 is a flowchart illustrating a process for creating and handling trouble tickets in a common trouble ticket platform according to one embodiment of the present invention. As illustrated in this example, creating trouble tickets in a common trouble ticket platform can begin with monitoring 505 by an Internet-enabled consumer product for one or more conditions or events by a device agent installed thereon. In response to detecting 510 the occurrence of the one or more conditions or events, the device agent can generate 515 a trouble ticket and send 520 the trouble ticket to a catcher service. The trouble ticket can comprise a set of predefined content in a predefined format based on a type of the consumer product. Generating 515 the trouble ticket can comprise generating the set of predefined content. For example, the set of predefined content can comprise one or more of an error log, one or more images, a serial number of the consumer product, a model number of the consumer product, a version number of the consumer product, or a build number of the consumer product. In some cases, generating 515 the trouble ticket can further comprise generating a set of custom content defined by a producer of the consumer product.

Once generated 515 and sent 520, handling trouble tickets in a common trouble ticket platform can comprise receiving 525 and processing 530 the trouble ticket by a computer system executing a catcher service. The computer system executing the catcher service can then forward 535 the processed trouble ticket to a Customer Relationship Management (CRM) application. For example, processing 530 the trouble ticket can comprise identifying a vendor of the consumer product to which the trouble ticket relates from a plurality of vendors and forwarding 535 the trouble ticket to the CRM application can comprise forwarding the trouble ticket to a CRM application associated with the identified vendor. In another example, processing 530 the trouble ticket can comprise filtering the received trouble ticket based on a set of criteria provided by a vendor of the consumer product. Additionally or alternatively, processing 530 the trouble ticket can comprise aggregating the trouble ticket with one or more other trouble tickets based on a customer, a product, or a vendor of the consumer product related to the trouble ticket. Processing 530 the trouble ticket can additionally or alternatively comprise maintaining one or more metrics related to received trouble tickets. For example, the metrics can comprise a count per product or a count per vendor.

A computer system executing the CRM application can receive 540 the trouble ticket from the catcher service and process 545 the received trouble ticket. For example, processing 545 the received trouble ticket can comprise assigning the trouble ticket to an automated process or a human agent for handling problems with the consumer product represented by the trouble ticket. While not illustrated here for the sake of clarity, handling the trouble tickets can additionally or alternatively comprise the catcher service, the CRM application, another application or system, or some combination thereof providing one or more other services related to the trouble ticket. For example, the one or more services can comprise providing analytics based on the trouble ticket. Additionally or alternatively, the one or more services can comprise providing an eService marketplace providing one or more of notification of product issues or recalls, access to information related to issue resolution, information or an interface for arranging for repairs, or access to technical information related to the consumer product. In another example, the one or more services can additionally or alternatively comprise an automatic registration process. In some cases, the service can comprise providing one or more of automatic product updates, automatic product alters, or personalized identification of trouble tickets by customer. Additionally or alternatively, the one or more services can comprise providing remote diagnostics of the consumer product. Other services are contemplated and considered to be within the scope of the present invention.

Figure 6:
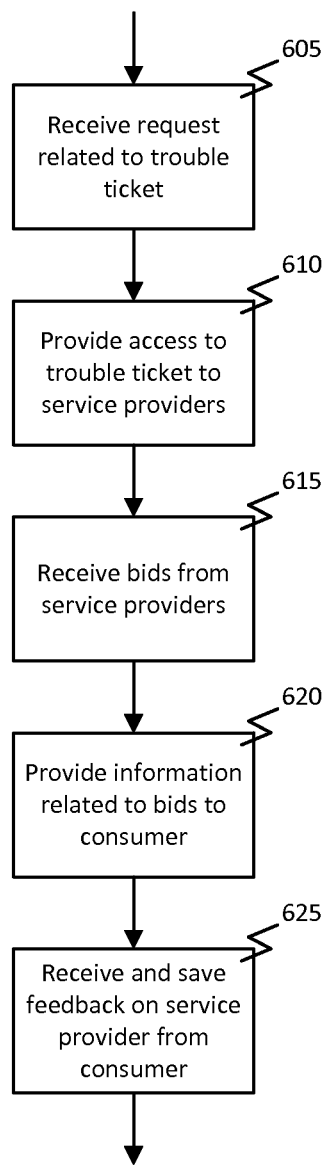
FIG. 6 is a flowchart illustrating a process for handling trouble tickets in an eService marketplace according to one embodiment of the present invention.

FIG. 6 is a flowchart illustrating a process for handling trouble tickets in an eService marketplace according to one embodiment of the present invention. As illustrated in this example, the eService marketplace can receive 605 a request from a consumer related to the trouble ticket. For example, the request may be received through a web site, email, text message, or other channel. In other cases, the trouble ticket itself may comprise the request. The request can comprise a request for bids for service of the consumer product. That is, receiving 605 the trouble ticket and/or request can comprise a request to address the problems with the consumer device as represented in the trouble ticket.

Thus, the trouble ticket and/or request, the eService marketplace can provide 610 access to the trouble ticket to a plurality of service providers in response to the trouble ticket and/or request from the consumer. Providing 610 access to the trouble ticket can comprise, for example, forwarding the trouble ticket to the service providers, posting the trouble ticket or a link thereto on a web page or other interface available to service providers, etc. At some point thereafter, the eService marketplace can receive 615 one or more bids for service of the consumer product from one or more of the plurality of service providers. That is, one or more of the service providers may respond to the trouble ticket through the web page or other interface with an offer to address the problem. Information related to the received bids can then be provided 620 to the consumer. Again, this information may be provided 620 to the consumer in the form of a web page, email, text message, voicemail message, or any other channel available to the consumer. The information related to the received bids can comprise, for example, one or more of cost of each bid, a customer rating or each service provider from which one or more of the bids is received, or analytics information about performance of each service provider from which one or more of the bids is received.

In some cases, the information provided 620 may include contact information through which the consumer may contact the service provider to arrange for service. In other cases, the consumer may contact the service provider through the eService marketplace, e.g., through an instant message, chat, email, web conference, or any other channel that may be available to the consumer and service provider. In some cases and after the service provider has attempted to address the trouble ticket, a rating and/or other feedback on the service provider can be received 625 by the eService marketplace from the consumer. The rating can be based on performance of service directed to the trouble ticket by the service provider. This feedback can be received through any of a number of channels including but not limited to web page or email presenting a survey, a free-form email from the consumer, an Interactive Voice Response (IVR) dialog with the consumer, a text message from the consumer, etc.

The eService marketplace can provide a number of additional services including but not limited to analytics services based on received trouble tickets and/or any feedback received 625. For example, these analytics may be part of the information provided 620 to the consumer related to the bidding service providers. Other services provided by the eService marketplace can include, for example, providing one or more of notification of product issues or recalls, access to information related to issue resolution, information or an interface for arranging for repairs, or access to technical information related to the consumer product. Additionally or alternatively, the eService marketplace can provide an automatic registration process based on special trouble tickets generated on the initial power-up of the device. In some cases, the eService marketplace can additionally or alternatively provide one or more of automatic product updates, automatic product alters, or personalized identification of trouble tickets by customer. Other services are contemplated and considered to be within the scope of the present invention.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for creating and handling trouble tickets in a common trouble ticket platform for an Internet of Things comprising a plurality of Internet-enabled consumer devices, the method comprising:
   providing a plurality of toolkits to a plurality of producers of the plurality of Internet-enabled consumer devices, wherein:
   each Internet-enabled consumer device of the plurality of Internet-enabled consumer devices comprises a memory, a processor, and a communication component for communicating over a network, and
   each toolkit of the plurality of toolkits generates a device agent on one of the plurality of Internet-enabled consumer devices, the device agent being an application executed by the processor of the Internet-enabled consumer device that monitors the Internet-enabled consumer device and, upon detection of a condition, creates a trouble ticket having a predefined format and content;
   receiving, by a computer system executing a catcher service implemented as a cloud service, a plurality of trouble tickets from a plurality of device agents executing on different Internet-enabled consumer devices of the plurality of Internet-enabled consumer devices, wherein:
   each trouble ticket from the plurality of trouble tickets is received from the device agent executing on the processor of the Internet-enabled consumer device having trouble, and
   each trouble ticket from the plurality of trouble tickets comprises a set of predefined content in the predefined format; and
   processing, by the computer system executing the catcher service implemented as the cloud service, the received plurality of trouble tickets by:
   identifying, for each trouble ticket, a producer from the plurality of producers that produced the Internet-enabled consumer device associated with the trouble ticket,
   aggregating each of the plurality of trouble tickets with one or more other trouble tickets that have at least a same producer of the Internet-enabled consumer device identified with the trouble ticket to create an aggregated group of trouble tickets for a respective producer;
   forwarding the aggregated group of trouble tickets to a Customer Relationship Management (CRM) application of the respective producer identified for the aggregated group of trouble tickets.

2. The method of claim 1, wherein each toolkit of the plurality of toolkits is directed to a different type of Internet-enabled consumer device and wherein the set of predefined content in the predefined format of the trouble ticket is defined, at least in part, by the toolkit.

3. The method of claim 1, wherein at least one of the plurality of trouble tickets further comprises customized content of the Internet-enabled consumer device associated with the trouble ticket.

4. The method of claim 3, wherein the customized content comprises one or more of an error log, one or more images, a serial number of the Internet-enabled consumer device associated with the trouble ticket, a model number of the Internet-enabled consumer device associated with the trouble ticket, a version number of the Internet-enabled consumer device associated with the trouble ticket, or a build number of the Internet-enabled consumer device associated with the trouble ticket.

5. The method of claim 4, wherein the customized content is defined by the producer of the Internet-enabled consumer device associated with the trouble ticket.

6. The method of claim 1, wherein the catcher service is implemented as a web service.

7. The method of claim 1, wherein processing the received trouble tickets further includes, for each trouble ticket from the plurality of trouble tickets:
filtering the trouble ticket based on a set of criteria provided by the producer of the Internet-enabled consumer device associated with the trouble ticket.

8. The method of claim 1, wherein processing the received trouble tickets further includes, for each trouble ticket from the plurality of trouble tickets further includes:
aggregating the trouble ticket with one or more other trouble tickets based on a customer, or a product of the Internet-enabled consumer device associated with the trouble ticket.

9. The method of claim 1, further comprising:
maintaining one or more metrics related to the received plurality of trouble tickets, the metrics including at least a count per product or a count per producer.

10. The method of claim 1, further comprising, for a first trouble ticket from the plurality of trouble tickets:
receiving, by a second computer system executing the CRM application of the producer, the first trouble ticket from the catcher service; and
processing, by the computer system executing the CRM application, the received first trouble ticket, wherein processing the received first trouble ticket includes assigning the first trouble ticket to an automated process or a human agent for handling problems with the Internet-enabled consumer device represented by the first trouble ticket.

11. The method of claim 1, further comprising:
providing, by a second computer system executing an eService marketplace, analytics services based on the received plurality of trouble tickets.

12. The method of claim 11, further comprising:
receiving, by the computer system executing the eService marketplace, a request from a consumer related to a first trouble ticket from the plurality of trouble tickets, the request comprising a request for bids for service of the Internet-enabled consumer device represented by the first trouble ticket;
providing, by the computer system executing the eService marketplace, access to the first trouble ticket to a plurality of service providers in response to the request from the consumer;
receiving, by the computer system executing the eService marketplace, one or more bids for service of the Internet-enabled consumer device represented by the first trouble ticket from one or more of the plurality of service providers; and
providing, by the computer system executing the eService marketplace, information related to the received one or more bids to the consumer.

13. The method of claim 12, wherein the information related to the received one or more bids comprises one or more of a cost of each bid, a customer rating for each service provider from which one or more of the bids is received, or analytics information about performance of each service provider from which one or more of the bids is received.

14. The method of claim 12, further comprising receiving, by the computer system executing the eService marketplace, a rating of one of the service providers from the consumer, the rating based on performance of service directed to the first trouble ticket by the service provider.

15. The method of claim 12, further comprising providing, by the computer system executing the eService marketplace, one or more of notification of product issues or recalls related to the Internet-enabled consumer device represented by the first trouble ticket, access to information related to issue resolution for issues related to the Internet-enabled consumer device represented by the first trouble ticket, information or an interface for arranging for repairs of the Internet-enabled consumer device represented by the first trouble ticket, or access to technical information related to the Internet-enabled consumer device represented by the first trouble ticket.

16. The method of claim 12, further comprising providing, by the computer system executing the eService marketplace, an automatic registration process.

17. The method of claim 12, further comprising providing, by the computer system executing the eService marketplace, one or more of automatic product updates related to the Internet-enabled consumer device represented by the first trouble ticket, automatic product alerts related to the Internet-enabled consumer device represented by the first trouble ticket, or personalized identification of trouble tickets by customer.

18. A system comprising:
a first Internet-enabled consumer device from a first vendor, the first Internet-enabled consumer device being of a first type, the first Internet-enabled consumer device comprising a first processor and a first memory, the first memory storing therein a first set of instructions which, when executed by the first processor, causes the first processor to execute a first device agent and create trouble tickets in a common trouble ticket platform by:
receiving, from a catcher service, a first toolkit of a plurality of different toolkits, each of the plurality of different toolkits directed to a different type of Internet-enabled consumer device, the first toolkit being directed to the first type,
monitoring by the first device agent for a first set of one or more conditions or events, wherein the first device agent is generated through the first toolkit, detecting, by the first device agent, an occurrence of one or more of the first set of one or more conditions or events on the first Internet-enabled consumer device, and in response to detecting the occurrence of the one or more of the first set of one or more conditions or events, generating, by the first device agent, a first trouble ticket and sending the first trouble ticket over a network, wherein the first trouble ticket comprises a first set of predefined content in a first predefined format based on the first type of the first Internet-enabled consumer device and wherein the first set of predefined content in the first predefined format of the first trouble ticket is defined, at least in part, by the first toolkit or by a catcher web service interface;

a second Internet-enabled consumer device from a second vendor, the second Internet-enabled consumer device being of a second type, the second Internet-enabled consumer device comprising a second processor and a second memory, the second memory storing therein a second set of instructions which, when executed by the second processor, causes the second processor to execute a second device agent and create trouble tickets in the common trouble ticket platform by:

receiving, from the catcher service, a second toolkit of the plurality of different toolkits, the second toolkit being directed to the second type, monitoring by the second device agent for a second set of one or more conditions or events, wherein the second device agent is generated through the second toolkit of the plurality of different toolkits, the second toolkit being directed to the second type, detecting, by the second device agent, an occurrence of one or more of the second set of one or more conditions or events on the second Internet-enabled consumer device, and in response to detecting the occurrence of the one or more of the second set of one or more conditions or events, generating, by the second device agent, a second trouble ticket and sending the second trouble ticket over the network, wherein the second trouble ticket comprises a second set of predefined content in a second predefined format based on the second type of the second Internet-enabled consumer device and wherein the second set of predefined content in the second predefined format of the second trouble ticket is defined, at least in part, by the second toolkit or by the catcher web service interface; and a server comprising a third processor and a third memory, the third memory storing therein a third set of instructions which, when executed by the third processor, causes the third processor to execute the catcher service implemented as a cloud service, the catcher service handling a plurality of trouble tickets received from a plurality of devices including the first and second trouble tickets by:

receiving the plurality of trouble tickets from the plurality of devices, identifying, for each trouble ticket, a producer from the plurality of producers that produced the Internet-enabled consumer device associated with the trouble ticket, aggregating each of the plurality of trouble tickets with one or more other trouble tickets that have at least a same producer of the Internet-enabled consumer device identified with the trouble ticket to create an aggregated group of trouble tickets for a respective producer; and forwarding the aggregated group of trouble tickets to a Customer Relationship Management (CRM) application of the respective producer identified for the aggregated group of trouble tickets.

19. The system of claim 18, further comprising a second server comprising a fourth processor and a fourth memory, the fourth memory storing therein a fourth set of instructions which, when executed by the fourth processor, causes the fourth processor to execute an eService marketplace, the eService marketplace further handling the first trouble ticket by:

receiving a request from a consumer related to the first trouble ticket, the request including a request for bids for service of the first Internet-enabled consumer device;

providing access to the first trouble ticket to a plurality of service providers in response to the request from the consumer;

receiving one or more bids for service of the first Internet-enabled consumer device from one or more of the plurality of service providers; and providing information related to the received one or more bids to the consumer.

* * * * *